(12) United States Patent
Seino et al.

(10) Patent No.: US 6,400,881 B1
(45) Date of Patent: *Jun. 4, 2002

(54) OPTICAL DEVICE HAVING THIN FILM FORMED OVER OPTICAL WAVEGUIDE

(75) Inventors: Minoru Seino, Atsugi; Tadao Nakazawa; Shinji Taniguchi, both of Zama, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/118,936

(22) Filed: Jul. 20, 1998

(30) Foreign Application Priority Data

Aug. 11, 1997 (JP) .............................................. 9-216050

(51) Int. Cl.[7] .............................. G02B 6/00; G02F 1/335
(52) U.S. Cl. .............................. 385/130; 385/2; 385/7; 385/8; 385/10
(58) Field of Search .............................. 385/130, 2, 7, 385/8, 10

(56) References Cited

U.S. PATENT DOCUMENTS

| 5,002,349 A | | 3/1991 | Cheung et al. |
| 5,218,653 A | * | 6/1993 | Johnson et al. ................ 385/11 |
| 5,446,807 A | | 8/1995 | Baran et al. |

(List continued on next page.)

FOREIGN PATENT DOCUMENTS

| JP | 5-150204 | 6/1993 |
| JP | 5-181098 | 7/1993 |
| JP | 5-323248 | 12/1993 |
| JP | 5-333298 | 12/1993 |
| JP | 7-270735 | 10/1995 |
| JP | 8-050267 | 2/1996 |
| JP | 8-122724 | 5/1996 |
| JP | 8-146369 | 6/1996 |
| JP | 8-211349 | 8/1996 |
| JP | 8-234150 | 9/1996 |
| JP | 8-286160 | 11/1996 |
| JP | 90-049994 | 2/1997 |

OTHER PUBLICATIONS

Goto et al., "Collinear Acoustooptic Matrix Switches with Improved Wavelength–Selective Characteristics for WDM Photonic Switching", *Photonics in Switching*, Apr. 1996.
Aronson et al., "Reduced sidelobe integrated acousto–optic filter with birefringence apodization", *Optics Letters*, Oct. 1993, vol. 18, No. 20, pp. 1721–1723.

(List continued on next page.)

*Primary Examiner*—Darren Schuberg
*Assistant Examiner*—Fayez Assaf
(74) *Attorney, Agent, or Firm*—Staas & Halsey LLP

(57) ABSTRACT

An optical device has a substrate, a polarization beam splitter, first and second pairs of optical waveguides, a transducer and a thin film. The polarization beam splitter is formed on the substrate and has input and output sides. The first and second pairs of optical waveguides are formed on the substrate to guide polarized optical signals. The first pair of optical waveguides meets at the input side of the polarization beam splitter, and the second pair of optical waveguides meets at the output side of the polarization beam splitter. The transducer is formed of a comb-tooth electrode on the substrate to excite a surface acoustic wave on the substrate and rotate the polarization of the optical signal. The thin film covers a portion of each waveguide of either the first or second pairs of optical waveguides. The thin film may be formed of silicon dioxide or indium dioxide, either with a metal oxide optionally added thereto. The speed of sound in the thin film is less than that in the substrate. The thin film is formed of a material which is transparent to the optical signal. The thin film has a refractive index smaller than that of the optical waveguides.

67 Claims, 12 Drawing Sheets

U.S. PATENT DOCUMENTS

| | | |
|---|---|---|
| 5,400,171 A | 9/1995 | Song |
| 5,455,877 A | 10/1995 | Baran et al. |
| 5,652,808 A | 7/1997 | Duchet et al. |
| 5,652,809 A | 7/1997 | Aronson |
| 5,677,971 A | 10/1997 | Okayama et al. |
| 5,748,810 A | 5/1998 | Schmid |
| 5,781,669 A | 7/1998 | Schmid et al. |
| 5,796,882 A | 9/1998 | Schmid |
| 5,818,980 A | 10/1998 | Herrmann |
| 5,841,912 A * | 11/1998 | Mueller-Fiedler et al. ..... 385/7 |
| 5,850,491 A | 12/1998 | Morasca et al. |
| 5,850,492 A | 12/1998 | Morasca et al. |

OTHER PUBLICATIONS

Kar–Roy et al., "Integrated Acoustooptic Tunable Filters Using Weighted Coupling", *IEEE Journal of Quantum Electronics*, vol. 30, No. 7, Jul. 1994, pp. 1574–1586.

Kar–Roy et al., "Ultralow Sidelobe–Level Integrated Acoustooptic Tunable Filters Using Tapered–Gap Surface Acoustic Wave Directional Couplers", *Journal of Lightwave Technology*, vol. 12, No. 6, Jun. 1994, pp. 977–982.

Harris et al., "Acousto–Optic Tunable Filter", *Journal of the Optical Society of America*, vol. 59, No. 6, Jun. 1968, pp. 744–747.

Herrmann et al., "Polarization Independent Integrated Optical, Acoustically Tunable Wavelength Filters/Switches with Tapered Acoustical Directional Coupler", *IEEE Photonics Technology Letters*, vol. 6, No. 11, Nov. 1994, pp. 1335–1337.

D.A. Smith et al., "Sidelobe suppression in an acousto–optic filter with a raised–cosine interaction strength", *Appl. Phys. Lett.*, vol. 61, No. 9, Aug. 1992, pp. 1025–1027.

Kar–Roy et al., "Low–Sidelobe Weighted–Coupled Integrated Acoustooptic Tunable Filter Using Focused Surface Acoustic Waves", *IEEE Photonics Technology Letters*, vol. 4, No. 10, Oct. 1992, pp. 1132–1135.

Smith et al., "Integrated–Optic Acoustically–Tunable Filters for WDM Networks", *IEEE Journal of Selected Areas in Communications*, vol. 8, No. 6, Aug. 1990, pp. 1151–1159.

d'Alessandro et al, "Multichannel Operation of an Integrated Acousto–Optic Wavelength Routing Switch for WDM Systems", *IEEE Photonics Technology Letters*, vol. 6, No. 3, Mar. 1994, pp. 390–393.

Baran et al., "Multiwavelength performance of an apodized acousto–optic switch", *OFC '94 Technical Digest*, pp. 57–58.

Jackel et al., "Multichannel Operation of AOTF Switches: Reducing Channel–to–Channel Interaction", *IEEE Photonics Technology Letters*, vol. 7, No. 4, Apr. 1995, pp. 370–372.

T. Hosoi, Widely tunable polarization–independent LiNbO$_3$ acousto–optic filter with high sidelobe suppression, *OFC '96 Technical Digest*, pp. 248–249.

Jane E. Baran et al., "Multichannel Operation of AOTF Switches: Reducing Channel–to–Channel Interaction", *IEEE Photonics Technology Letters*, vol. 7, No. 4, Apr. 1995, pp. 370–372.

M. M. Choy et al., "Observation of Coherent Interchannel Interferance in the Multiwavelength Operation of an Accoustooptic Filter", *IEEE Photonics Techology Letters*, vol. 7, No., Jul. 1989, pp. 171—172.

* cited by examiner

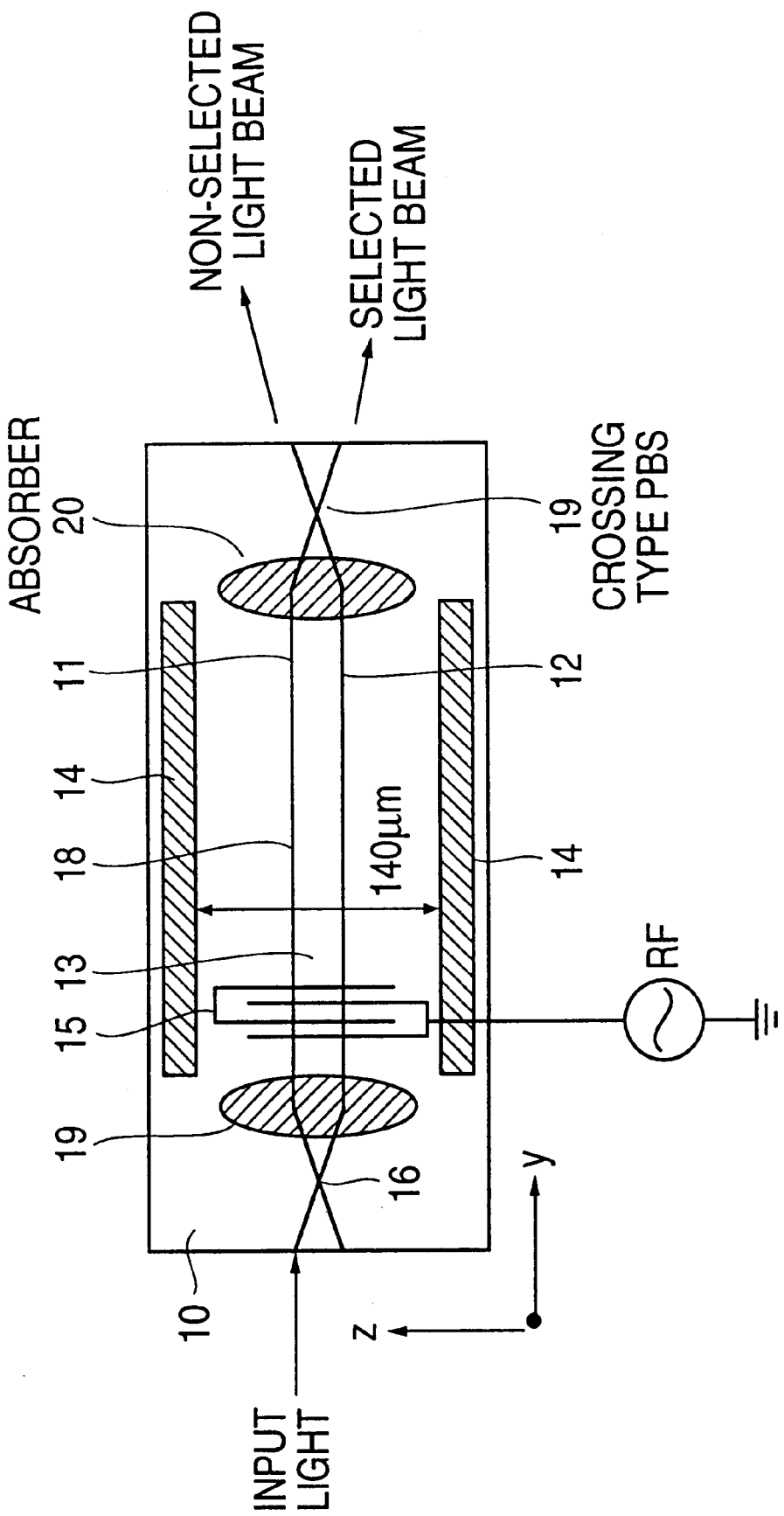
FIG. 3 *(PRIOR ART)*

|  | SAW PROPAGATION RATE BECOMES HIGHER | SAW PROPAGATION RATE BECOMES SLOWER |
|---|---|---|
| HARDNESS FOR SUBSTRATE | HARD | SOFT |
| WEIGHT | LIGHT | HEAVY |

OPTICAL DEVICE HAVING THIN FILM FORMED OVER OPTICAL WAVEGUIDE

CROSS-REFERENCE TO RELATED APPLICATIONS

This application is based up on and claims priority to Japanese Patent Application Number 09-216050 filed Aug. 11, 1997, the contents being incorporated herein by reference.

BACKGROUND OF THE INVENTION

1. Field of the Invention

The present invention relates to an optical device in general and more particularly to an acousto-optic device that may be used in an optical transmission system to add, drop and modulate selected wavelengths.

2. Description of the Related Art

In recent years, progress to a highly sophisticated information society has generated a tremendous amounts of information and an optical communication system using an optical fiber has been introduced as a way of transmitting such information. With this optical communication system, the transmission capacity has been increased year by year with the realization of a high speed modulation rate. A modulation rate of Gb/s or higher has already been put into practical use.

However, the need for a transmission systems which can transmit a large amount of data, such as that from image information, is expected to increase in the future. Such a high capacity system may be now required to have the transmission capacity of one Tb/s or more. The current systems cannot satisfy the requirement for the above transmission capacity only by improving the modulation rate. Therefore, an optical wavelength multiplex transmission/communication system is considered indispensable, and there have been attempts in recent years to introduce such a system.

An important element for realizing optical wavelength multiplex communication is the optical wavelength filter. This filter can combine onto a single optical fiber light beams of different (perhaps many different) wavelengths respectively generated by different light sources and can branch light beams of the different wavelengths transmitted through the single optical fiber to respective different fibers and detectors. The filter is thus a key device of the optical wavelength multiplex transmission system. The filter is required to satisfy different requirements depending on the system in which it is used. For example, the filter should be able to work with different numbers of wavelengths, from several wavelengths to about 100 wavelengths. The filter should be able to work with different wavelengths interval, from 1 nm or less to several tens of nm. The filter should be extremely low cost for application to an access system.

There are several devices which utilize mutual interference between an acoustic wave and an optical beam. FIG. 1 is a perspective view of such a device, in which Ti metal is thermally diffused into an X-Y cut $LiNbO_3$ substrate 2 to form a channel waveguide 1, and a flat waveguide. On the substrate 2, this device has a waveguide lens 3 and a transducer 4 formed from a comb-tooth type electrode for exciting a surface acoustic wave (SAW).

In this device, a light beam is converted to a parallel light beam by the waveguide lens 3. A SAW generates a refractive index grating from the photo acoustic effect of the SAW. The light beam is diffracted by this grating into different directions depending on the frequency of SAW. When this diffracted light beam is condensed by lens 5, the diffracted light beam is focused to different points because the device functions as an optical deflector.

FIG. 2 is a top view of another example of a related art device utilizing the refractive index grating created by a SAW. This device, a collinear AO module with an inhomogeneous SAW waveguide, was present at the Photonics in Switching conference, at Sendai, Apr. 21–25, 1996. In this device, parallel optical waveguides 7, 8 are formed on a Y cut $LiNbO_3$ substrate 6 and a thin film 9 formed of $Ta_2O_5$ is formed on the substrate as a SAW waveguide. In operation, even number mode light and odd number mode light are combined by the refractive index grating between the parallel optical waveguides 7, 8. As before, the SAW creates the refractive index grating. A selected wavelength of a light beam incident to the optical waveguide 7 is switched to the optical waveguide 8. The selected wavelength corresponds to the refractive index grating created by the SAW. In this device, the grating is weighted through a change in width a(z) and thickness h(z) of the thin film 9 which guides the SAW. The thin film 9 reduces a siderobe in the optical waveform. Moreover, a device in which weighting is realized by forming the SAW waveguide crossing the optical waveguide is also known.

FIG. 3 is a top view of an optical waveguide device which extracts a light beam having a selected wavelength and executes modulation by rotating the main axis of the waveguide refractive index for the selected wavelength to thereby rotate the polarization of the selected wavelength. The selected wavelength corresponds to the frequency of the SAW generated in the device. Optical waveguides 11, 12 are formed by diffusing Ti in a X cut $LiNbO_3$ substrate 10 and creating deeply diffused regions 14 of Ti on both sides of a region 13 for guiding a SAW generated by a SAW transducer 15. To generate the SAW transducer (IDT) 15 is provided with a radio frequency (RF) signal.

The TE (transverse electric) and TM (transverse magnetic) mode beams of an incident light beam are isolated by a crossing type polarization beam splitter (crossing type PBS) 16, and thereby the TE mode beam is incident to the optical waveguide 12, while the TM mode beam is incident to the optical waveguide 11. In optical waveguide 11, the light beam of a selected wavelength corresponding to the SAW is converted from the TM mode to the TE mode through rotation of polarization. In optical waveguide 12, the TE mode beam of the selected wavelength is converted to a TM mode beam through rotation of the polarization.

In this example, the TM mode beams of non-selected, non-rotated wavelength light are output from the optical waveguide 11 to the non-selected beam side via a crossing type PBS 17, while the TE mode beam of the selected wavelength is output from waveguide 11 to the selected beam side. In optical waveguide 12, the TE mode beams of non-selected, non-rotated light are output to the non-selected beam side and the TM mode beam of the selected wavelength is output to the selected beam side. Thereby, the selected wavelength can be extracted and modulated using this optical waveguide device. In the FIG. 3 device, absorbing bodies 19 and 20 are SAW absorbing bodies for preventing the SAW from being reflected at end faces of the substrate.

In the FIG. 3 device, the SAW is propagated at a higher rate in the deeply diffused region 14 of Ti than in the substrate due to the influence of Ti. The SAW is thus trapped and propagated in the region 13 where the propagation rate of the SAW between deeply diffused regions 14 of Ti is rather low. Therefore regions 14 function as a SAW waveguide.

In the filter and switch of the optical waveguide shown in FIG. 1 or FIG. 2, where even and odd number modes are coupled, filtering and switching can be realized independently respectively for the TE mode beam and the TM mode beam. This can occur because the SAW is generated or formed with perfect symmetry, but the propagation constants of the TE mode beam and the TM mode beam in the optical waveguide formed on the plane are generally different.

Moreover, coupling between two adjacent optical waveguides is believed to depend on the polarization of the TE and TM mode beams. Therefore, filter and switch characteristics also depend on the polarization. This causes a problem in a device which is required to control a light beam having a desired polarization, which requirement may be present in an optical communication system.

To eliminate the polarization dependency, it has been proposed to use two pairs of the FIG. 1 and FIG. 2 devices to isolate the input beam by polarization. These two paris would correspond to the desired polarization. However, it is not practical to use two pairs of devices. On the other hand, in FIG. 3, the TE mode beam is converted to a TM mode beam and the TM mode beam to a TE mode beam by isolating polarization modes. Therefore, the dependence on polarization can be eliminated. However, to prepare the device, a time as long as several tens of hours is required to form the deeply diffused regions 14 of Ti Another problem with the FIG. 3 device is that regions 14 cannot be formed to cross the optical waveguides as shown in FIG. 2. Regions 14 cannot be formed on the optical waveguides because deeply diffused Ti erases the optical waveguides, which may also be formed by Ti diffusion. Without formation on the optical waveguides, the siderobes in the waveform cannot be reduced. Moreover, in a SAW waveguide formed from deep diffused regions 14 of Ti, the trapping force for the SAW is weak, and therefore, the SAW waveguide is ineffective.

These three devices demonstrate that a device which operates with TE/TM mode conversion (FIG. 3) is known and devices having a thin film (FIGS. 1 or 2) are known. Although these devices have been known for some time, no one has ever been able to form a thin film on a TE/TM mode conversion device, as mentioned above.

In order to successfully form a SAW waveguide, the sound velocity within the guide, where the acoustic waves are to propagate, must be less than that at peripheral portion thereof. For this purpose, the waveguide must intuitively be formed with a material assuring lower sound velocity. However, the speed of sound is as high as about 6000 m/s in material, such as $SiO_2$ and $Al_2O_3$, which is often used for a buffer layer. It is intuitively not thought to be possible to form a higher speed film on such a buffer layer material. Moreover, sound velocity in $LiNbO_3$ is different, to a large extent, depending on the propagation direction (about 3500 to 4000 m/s) and a material assuring the adequate sound velocity for the selected direction is required. Moreover, if a film is to be formed on the optical waveguide, the material used for thin film must be transparent and have a refractive index which is smaller than that of $LiNbO_3$.

In addition, it is necessary to form, in the $LiNbO_3$ substrate, a SAW having an amplitude sufficient for executing the TE/TM mode conversion. It is considerably difficult and requires a large amount of work to design a thin film having a material, thickness and width satisfying the various conditions. Moreover, in performing TE/TM mode conversion in a substrate, when films of different materials are formed on the surface of substrate, the surface conditions change and this is feared to create problems effecting TE-TM mode conversion. Therefore, films of different materials have not yet been attempted.

With the reason explained above, it has been thought that a device for guiding a SAW with a thin film to perform TE/TM mode conversion cannot be realized. It is apparent that a device having a waveguide formed in the z-axis direction, as in FIG. 1 and FIG. 2, cannot realize the TE/TM mode conversion performed by the device of FIG. 3.

SUMMARY OF THE INVENTION

Accordingly, it is an object of the present invention to provide an acousto-optic device which can add and drop light of a specific wavelength.

It is another object of the present invention to provide an acousto-optic device which is not dependent on polarization.

It is a further object of the present invention to provide an acousto-optic device which does not require a long period of diffusion to fabricate.

It is a still further object of the present invention to provide an acousto-optic device which propagates light having a reduced siderobe.

These and other objects are accomplished by providing an optical device having a substrate, a polarization beam splitter, first and second pairs of optical waveguides, a transducer and a thin film. The polarization beam splitter is formed on the substrate and has input and output sides. The first and second pairs of optical waveguides are formed on the substrate to guide polarized optical signals. The first pair of optical waveguides meets at the input side of the polarization beam splitter, and the second pair of optical waveguides meets at the output side of the polarization beam splitter. The transducer is formed of a comb-tooth electrode on the substrate to excite a surface acoustic wave on the substrate and rotate the polarization of the optical signal. The thin film covers a portion of each waveguide of either the first or second pairs of optical waveguides. The thin film may be formed of silicon dioxide or indium dioxide, either with a metal oxide optionally added thereto. The speed of sound in the thin film is less than that in the substrate.

This speed of sound means the speed around the film (mainly, the speed under the film). The thin film is formed of a material which is transparent to the optical signal. The thin film has a refractive index smaller than that of the optical waveguides.

The SAW waveguide, of the present invention which can effectively guide a SAW, can be simply formed by providing a transparent thin film of $SiO_2$ to a thickness of about 1 μm or less on an $LiNbO_3$ substrate. The thin film forms a ridge type structure in approximately the same direction as the optical waveguide formed within the substrate. This device propagates the light beam approximately in either the X or Y direction.

The SAW is thought to be trapped because of the additional mass on the substrate from the film, the change of surface conditions and the trapping effect of the ridge type structure at the surface of the $LiNbO_3$. The SAW is not necessarily thought to be trapped by the different sound velocity in the thin film.

In the SAW guide formed as above, rotation of the crystal axis is sufficient for TE/TM mode conversion.

Moreover, by properly choosing the thickness, width and material of the film, the trapping strength of the SAW waveguide can be enhanced to a large extent compared with that of the related art device, and the strength and velocity of the SAW can be controlled to have the same distribution in both the width and traveling directions. The present invention provides wide flexibility in design and realizes sophisticated functions of TE/TM mode conversion in a SAW device.

With the optical waveguide device of the present invention, it is possible to realize a wavelength filter which is tunable to control the target wavelength. The present invention is indispensable and can be used as an add drop multiplexer (ADM), an optical cross connect and an optical exchange in an optical transmission system.

The present invention can focus on a single wavelength and act as a switch for that wavelength, thereby enabling modulation of that wavelength. Not only can the present invention simultaneously switch and modulate different selected wavelengths, but it can also function as an ASE light elimination filter to eliminate an ASE beam generated by an optical amplifier, thereby improving receiver sensitivity even after transmission over a long transmission line.

Because the filter of the present invention is tunable, can be mass produced, and can be produced for a low cost, the present invention is applicable to a wide range of optical transmission and processing systems. The present invention can enable combining and branching filters, provide switching and modulating functions, and improve wavelength characteristics.

BRIEF DESCRIPTION OF THE DRAWINGS

The invention will now be described in more detail in connection with the attached drawings wherein:

FIG. 3 is a top view of a third optical device of the related art;

FIG. 4b is a cross-sectional view of the device of FIG. 4a, taken along line IVB–IVB in FIG. 4a;

FIG. 13b is a cross-sectional view of the device shown in FIG. 13a taken through line XIIIB—XIIIB in FIG. 13a.

FIG. 14b is a cross-sectional view taken along line XIVB—XIVB in FIG. 14a;

DETAILED DESCRIPTION OF THE PREFERRED EMBODIMENTS

The preferred embodiments of the present invention will be explained with reference to the accompanying drawings in which like reference indicators represent like elements.

Figure 4A:
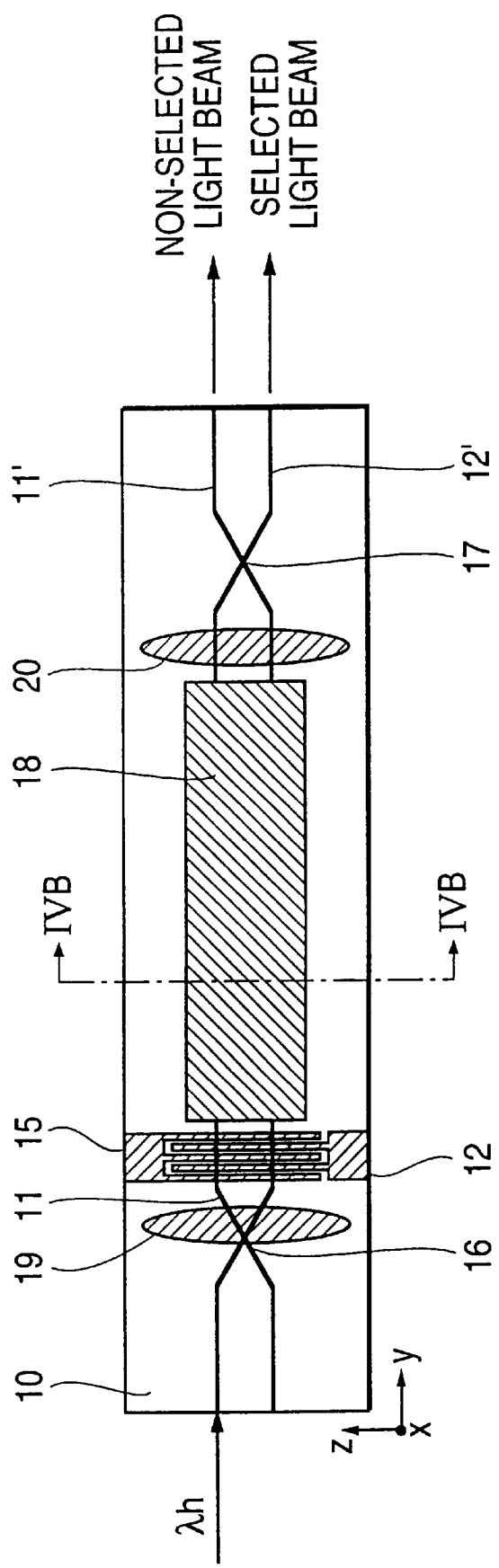
FIG. 4a is a top view of an optical device according to a first preferred embodiment of the present invention.

FIG. 4a is a top view of an optical device according to a first preferred embodiment of the present invention. Optical waveguides 11, 12 are formed extending in the y axis direction on an X-cut LiNbO$_3$ substrate 10. A transducer 15 formed of a comb-tooth electrode is formed on the substrate 10 to generate a SAW.

A SAW absorbing body 19 formed of a resist is formed between the optical input side of the LiNbO$_3$ substrate 10 and the transducer 15. Moreover, toward an optical output side of the substrate 10 from the substrate 15, a thin film 18 is formed on the substrate to serve as a SAW waveguide. The thin film 18 is an SiO$_2$ film which is transparent optically and has a refractive index lower than that of the LiNbO$_3$ substrate 10. In addition, a second SAW absorbing body 20 formed of a resist is provided between an optical output side of the substrate 10 and the thin film 18.

A light beam incident on an upper side waveguide (shown toward the top in this figure) is isolated into a TE mode beam and a TM mode beam by the crossing type PBS 16. These beams are propagated in parallel through the parallel waveguides formed under the thin film 18, and then these beams are combined again at the crossing PBS 17. From there, non-selected wavelengths are emitted from an upper side output waveguide 11'. A selected wavelength corresponding to the frequency of the SAW is subjected to mode conversion within the waveguides 11, 12 and is extracted from a lower side output waveguide 12'.

The waveguides 11, 11', 12 and 12' are respectively formed by the thermal diffusion of a Ti metal film at 1000° C. for 10 hours. The diffusion is done to provide waveguides having a depth of about 0.1 $\mu$m and a width of about 7 $\mu$m, for example. On the other hand, the transducer 15 is formed of 15 pairs of comb-tooth electrodes having a length of 140 $\mu$m and a period of about 20 $\mu$m. When a high frequency (perhaps radio frequency) power of about 175 MHz is applied to the transducer electrodes, a SAW is generated in the surface of the LiNbO$_3$ substrate 10 and the light beam having a wavelength of about 1.54 $\mu$m corresponding to the 175 MHz SAW frequency is subjected to TE/TM mode conversion.

Figure 4B:
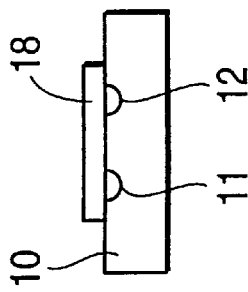

The SAW generated by the transducer 15 would be immediately diffused if a device for guiding the SAW was not provided. The thin film 18 acting as a SAW waveguide is formed of an $SiO_2$ film. The thin film 18 has a width of 120 μm, a thickness of 0.5 μm and a length of 30 mm. FIG. 4b is a cross-sectional view of the device shown in FIG. 4a, taken along line IVb–IVB in FIG. 4a.

Figure 5:
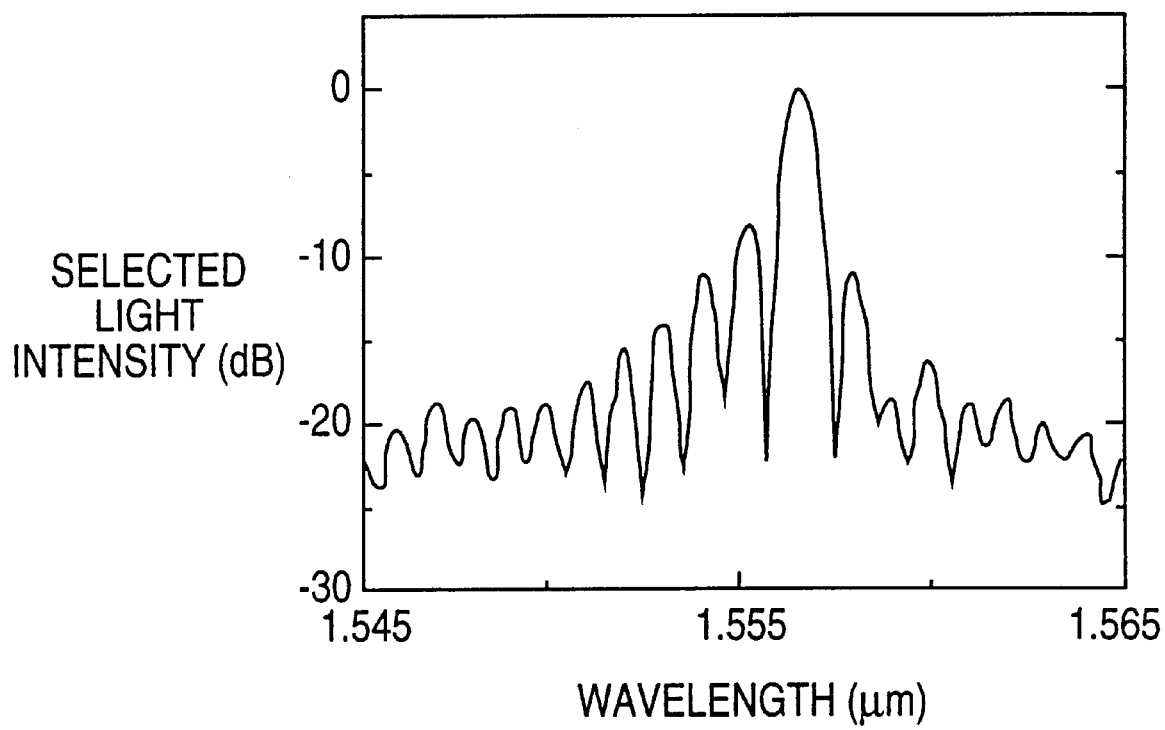
FIG. 5 is a representation of a waveform resulting from the device shown in FIGS. 4a and 4b.

FIG. 5 is a representation of a waveform resulting from the device shown in FIGS. 4a and b. The waveform shown in FIG. 5 is that from optical waveguide 12'. FIG. 5 shows a half width value of 0.82 μm and this corresponds with the result obtained from a theoretical calculation.

Moreover, when the thin film 18 is positioned as shown to evaluate the half width value and the power, no attenuation of the SAW was observed in the thin film 18 used for a SAW waveguide.

Figure 6:
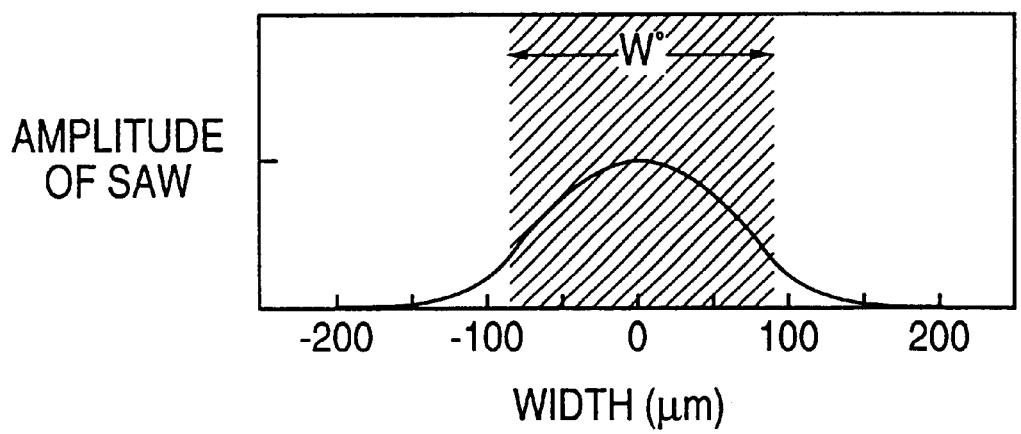
FIG. 6 shows a plot of a SAW intensity distribution across a width of the thin film shown in FIGS. 4a and 4b.

FIG. 6 shows a plot of SAW intensity distribution across a width of the thin film shown in FIGS. 4a and 4b. For FIG. 6, the thin film 18 had a width of 180 μm.

As can be seen, the intensity shifted from center, little by little, and a typical Gaussian distribution was observed. FIG. 6 confirms that the typical SAW of the basic mode is propagated, and that the thin film 18 functions as a SAW waveguide. Evaluation of many samples has confirmed that these samples operate as the waveguides with widths from 30 to 250 μm.

When indium oxide is added to $SiO_2$ for the material of the thin film 18, the trapping effect for the SAW is increased. An excellent SAW waveguide can also be formed when 100% indium oxide is used as the thin film material. However, in this case some of the light beam is absorbed by the thin film 18. The same effect can also be obtained when a metal oxide is added to a thin film formed mainly of indium oxide. It appears that a wide range of materials can be used for the thin film 18 because the trapping effect is caused by the additional mass on the substrate, the change in surface conditions from the film and the SAW trapping effect of the film itself (perhaps caused by the ridge type structure at the surface of the $LiNbO_3$ substrate 10). That is, the trapping effect is not necessarily the result of a different sound velocity in the thin film.

Figures 16, 17:
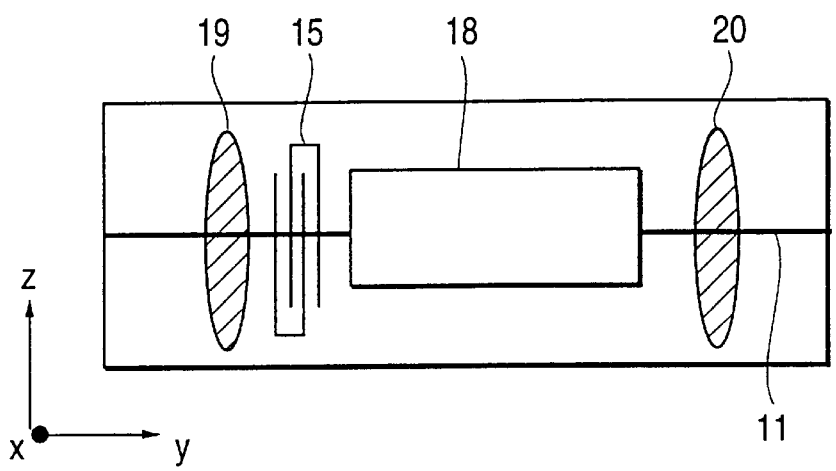
FIG. 16 is a top view of an optical device according to a sixth preferred embodiment of the present invention.
FIG. 17 is a chart showing how film hardness and weight effect SAW propagation rate.

FIG. 17 is a chart showing how film hardness and weight effect SAW propagation rate. As can be seen, when the thin film having a ridge shape is harder, the propagation rate is faster. When the thin film has a reduced mass (weight), the SAW propagation rate is faster.

Figure 2:
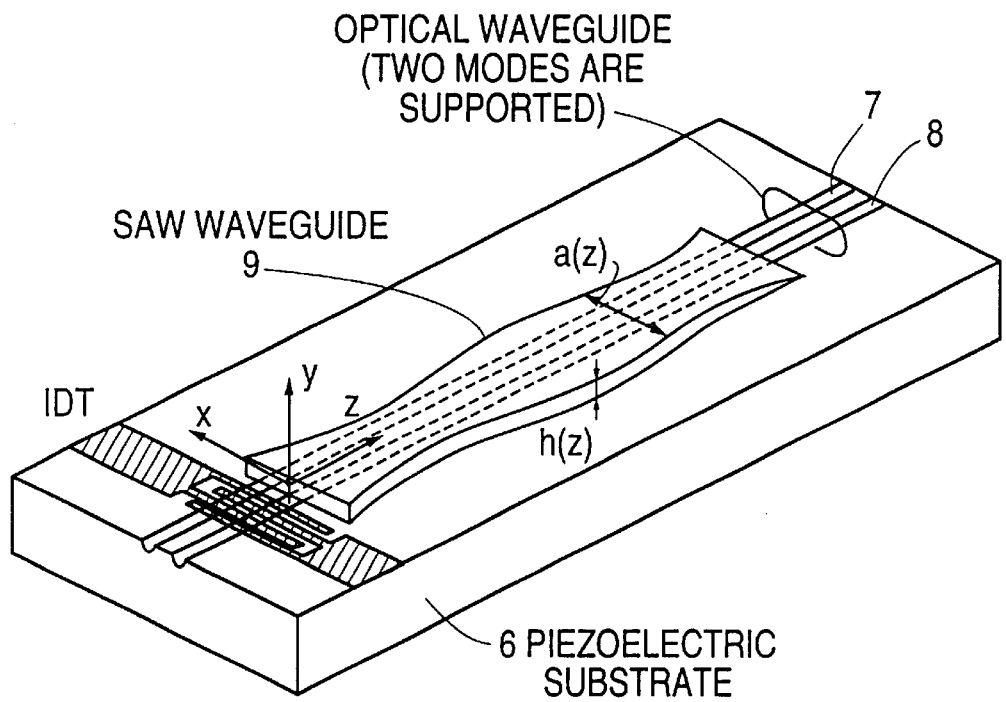
FIG. 2 is a perspective view of a second optical device of the related art.
Figure 18A:
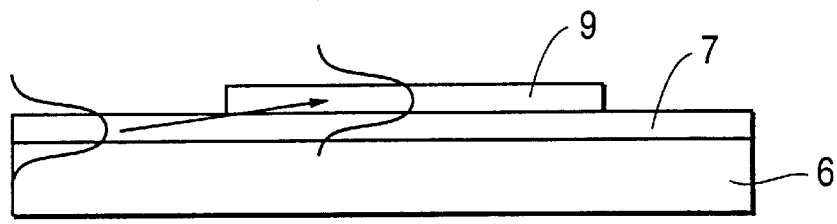
FIG. 18a is a cross sectional view of the device shown in FIG. 2 taken through an optical waveguide, annotated to show power distribution of a SAW therein.
Figure 18B:
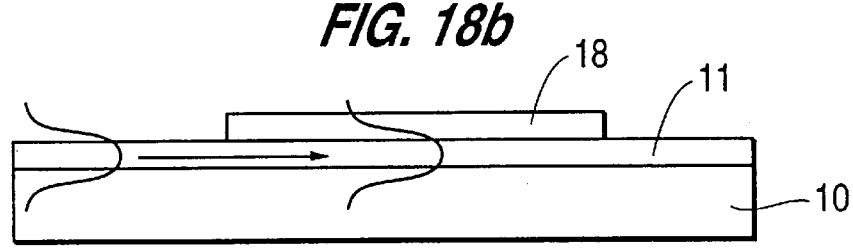
FIG. 18b is a cross sectional view of the device shown in FIGS. 4a and 4b taken though an optical waveguide, annotated to show power distribution of a SAW therein.

FIG. 18a is a cross sectional view of the device shown in FIG. 2 taken through an optical waveguide, annotated to show power distribution of a SAW therein. FIG. 18b is a cross sectional view of the device shown in FIGS. 4a and 4b taken though an optical waveguide, annotated to show power distribution of a SAW therein. As can be seen in FIG. 18a, the SAW is propagated in the thin film 9 itself due to the hardness of the thin film 9. As can be seen in FIG. 18b, the SAW is propagated in the substrate, and this is thought to be the result of the differing mass and surface conditions. Based on FIG. 18b, it appears that the SAW is trapped within the substrate, and this fact has been shown experimentally.

Figure 1:
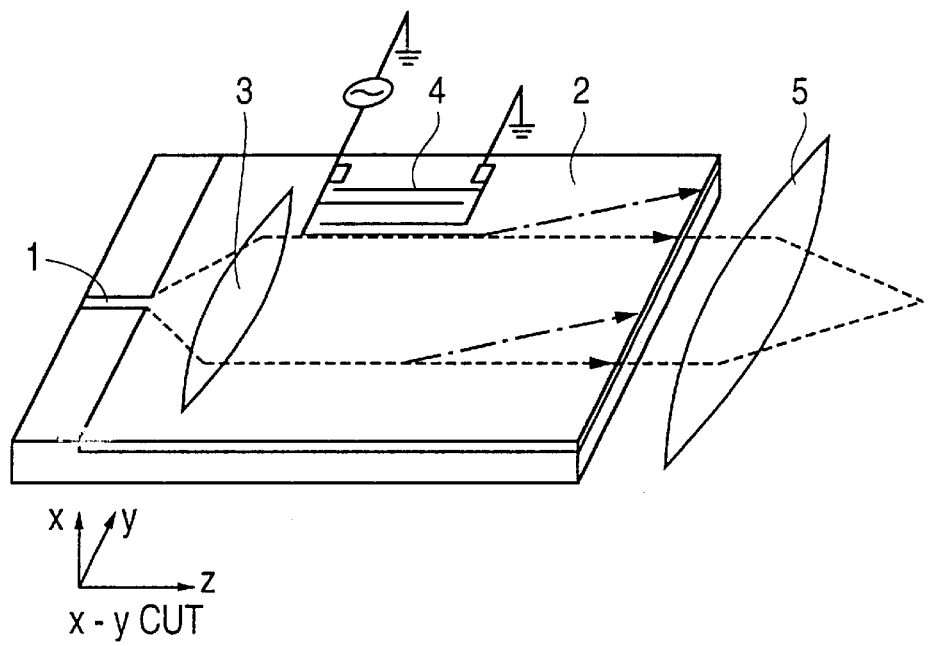
FIG. 1 is a perspective view of a first optical device of the related art.

In the first preferred embodiment shown in FIG. 1, an X cut $LiNbO_3$ substrate is used because it provides the maximum SAW excitation efficiency. However, a Z cut $LiNbO_3$ substrate can also generate the TE/TM mode conversion. When a Z cut $LiNbO_3$ substrate is used, TE/TM mode conversion is generated on either the X axis or Y axis, in the direction of light beam propagating through the optical waveguide.

Second Preferred Embodiment

Figure 7:
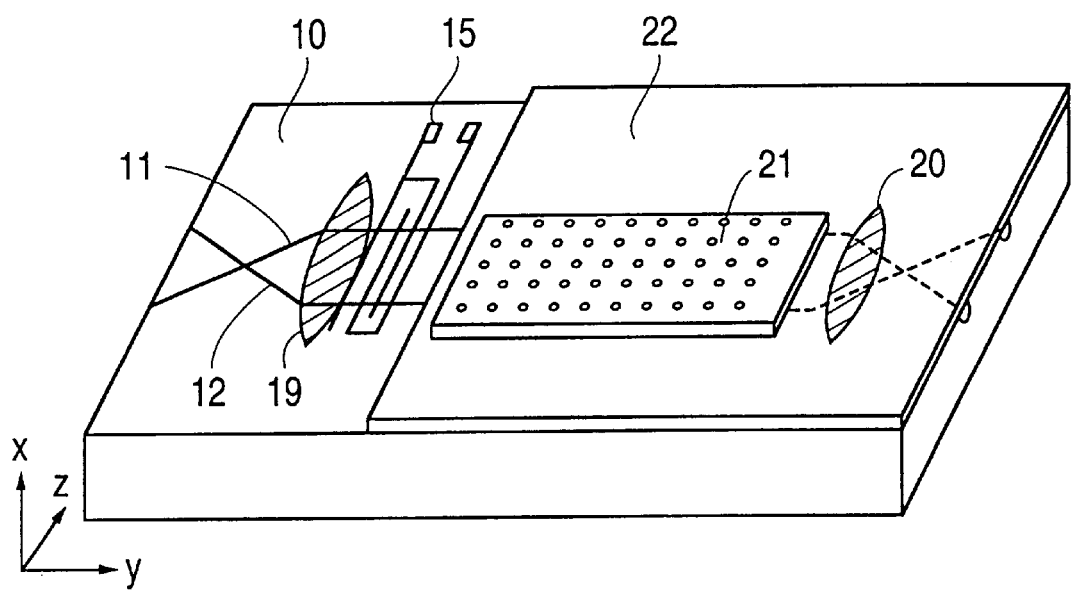
FIG. 7 is a perspective view of an optical device according to a second preferred embodiment of the present invention.

FIG. 7 is a perspective view of an optical device according to a second preferred embodiment of the present invention. In FIG. 7, a transparent film 22 having a refractive index smaller than that of the optical waveguides 11, 12 is formed on a portion of the $LiNbO_3$ substrate to cover a portion of the optical waveguides 11, 12. That is, the thin film 22 covers the portion of the substrate toward an output end, from the transducer 15. A metal film 21 is formed on a portion of the transparent film 22, in a shape of a SAW waveguide. The transparent thin film 22 may be an $SiO_2$ film having a thickness of 0.4 μm. The metal film 21 may be a gold metal film having a thickness of 0.3 μm. With the device shown in FIG. 7, a high quality SAW waveguide is obtained.

The metal film 21 has a lower sound velocity than the $LiNbO_3$ substrate and provides additional mass on the substrate. Referring to FIG. 4b, a ridge structure is formed with the thin film 18. In the second preferred embodiment, there is no ridge structure in the thin film 22, and thus, there is no uneven distortion caused by stress between the $LiNbO_3$ substrate 10 and the thin film 22 at an edge portion of the thin film 22. That is, in FIG. 7, thin film 22 extends to the edges (substantially the entire width) of the substrate 10.

Moreover, gold may be used as the metal film 21, and gold is rather soft. Therefore, if gold is used, little stress is caused. As mentioned above, when the thin film is patterned as shown in FIGS. 4a and 4b, there is stress at an edge portion thereof. Patterning can also decrease the trapping efficiency, and where no patterning is used, both of these problems are alleviated.

The Third Preferred Embodiment

Figure 8:
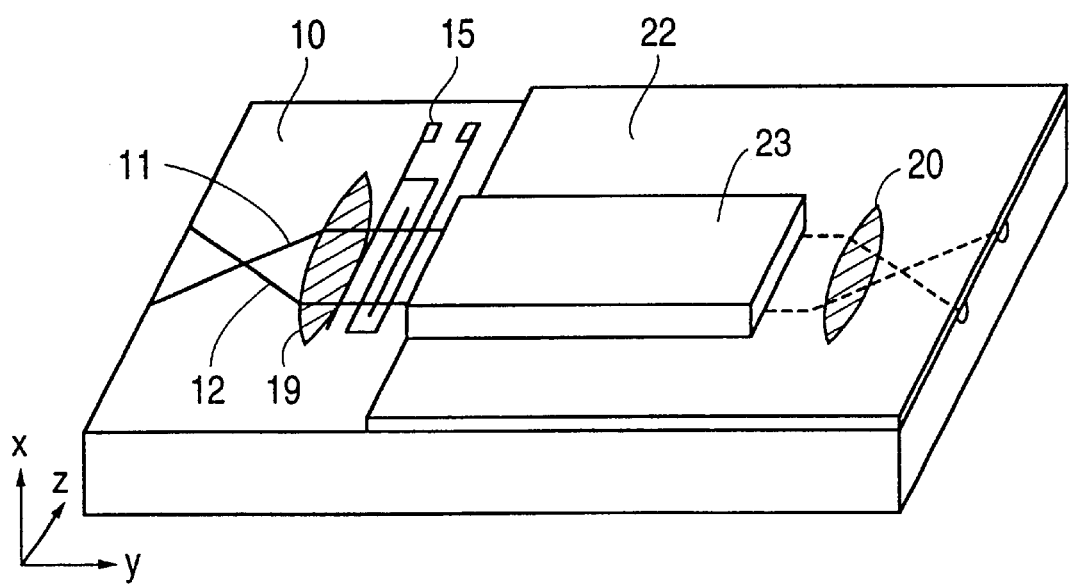
FIG. 8 is a perspective view of an optical device according to a third preferred embodiment of the present invention.

FIG. 8 is a perspective view of an optical device according to a third preferred embodiment of the present invention. In the third preferred embodiment, like the second preferred embodiment, the transparent thin film 22 does not have a ridge structure to thereby avoid stress generating from patterning within film 22. However, a thin film portion 23 having an increased thickness is allowed to remain. The thickness of the thin film 22 is 0.3 μm and the height of the thin film portion 23 above the thin film 22 is 0.5 μm. It has been confirmed that the device shown in FIG. 8 serves as an excellent SAW waveguide.

The Fourth Preferred Embodiment

Figure 9:
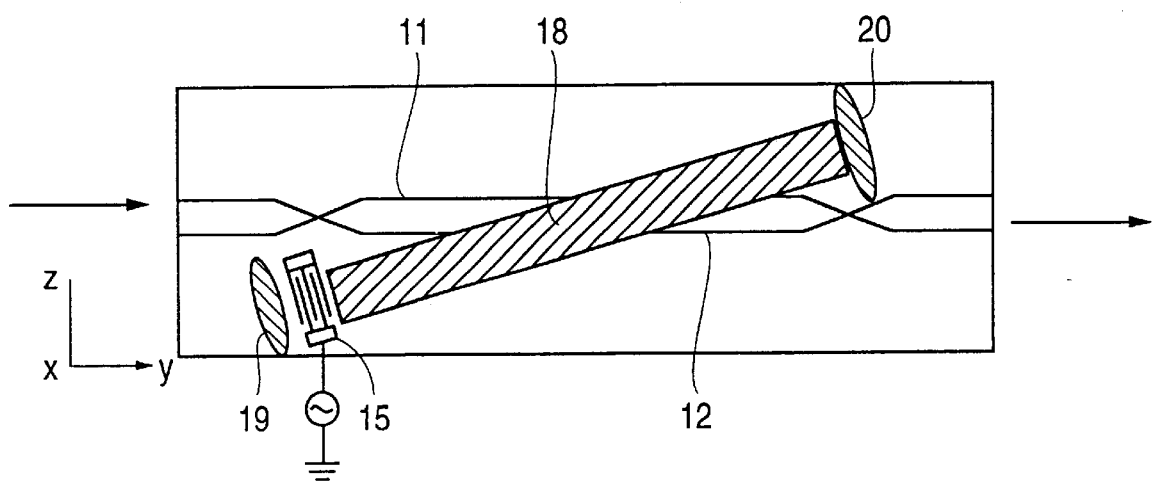
FIG. 9 is a top view of an optical device according to a fourth preferred embodiment of the present invention.
Figure 10:
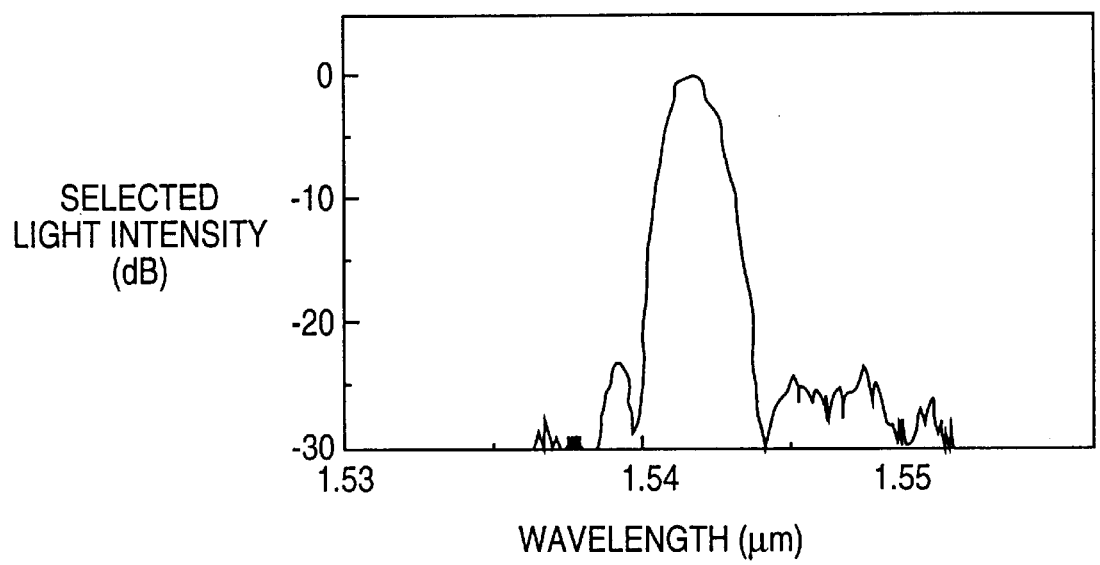
FIG. 10 is a representation of a waveform resulting from the device shown in FIG. 9.

FIG. 9 is a top view of an optical device according to a fourth preferred embodiment of the present invention. In FIG. 9, the thin film 18 is formed to cross the optical waveguides 11, 12. For the material of the thin film 18, 60 wt % InSn with $SiO_2$ added was used. The width of the thin film 18 was 120 μm. The thickness of the thin film was 0.4 μm and the angle with respect to the waveguides 11, 12 was 0.5 degrees. With the device shown in FIG. 9, TE/TM mode conversion effectuates a Gaussian type weighting in the traveling direction of the optical waveguide to realize a reduced siderobe in the resulting waveform. FIG. 10 is a representation of the waveform resulting from the device shown in FIG. 9. The weighting of the FIG. 9 device is only possible with the thin film 18 of the present invention.

Figure 11:
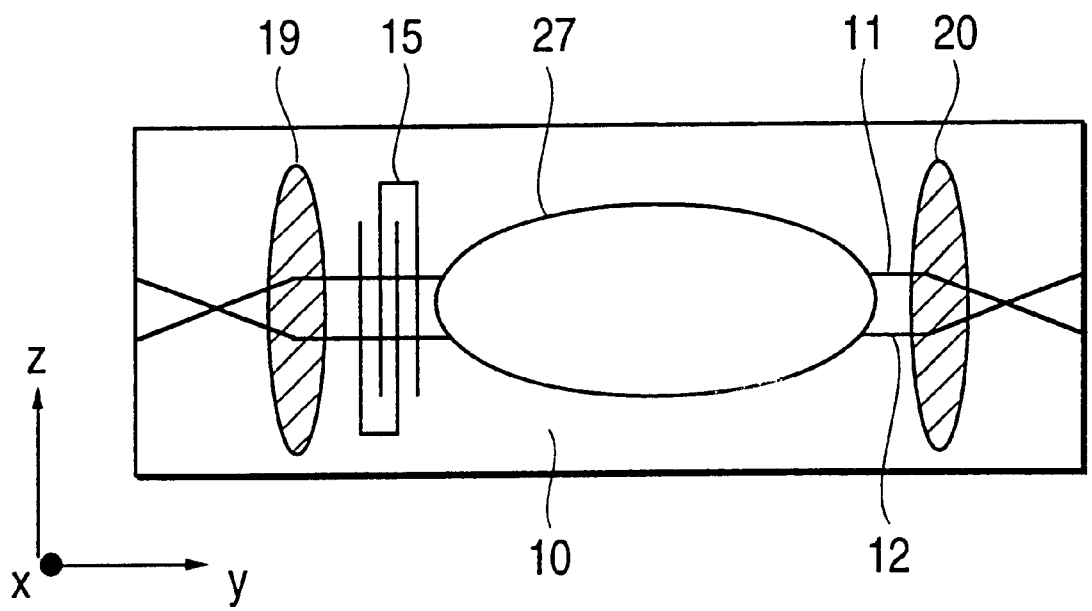
FIG. 11 is a top view of a first modification to the device shown in FIG. 9.

FIG. 11 shows a first modification to the device shown in FIG. 9. As can be seen in FIG. 11, the width of a thin film 27 acting as a SAW waveguide is changed to be greater at a middle portion than at end portions. Alternatively, the thickness can be varied. The device shown in FIG. 11 also exhibits an excellent intensity weighing following a Gaussian distribution.

Figure 12:
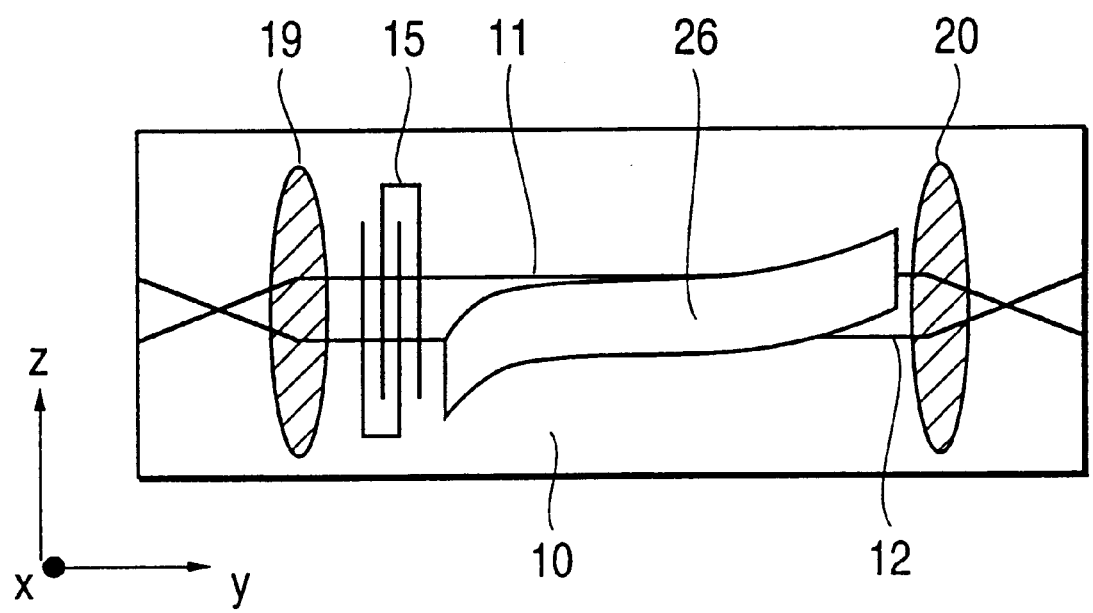
FIG. 12 is a top view of a second modification to the device shown in FIG. 9.

FIG. 12 is a top view of a second modification to the device shown in FIG. 9. In FIG. 12, a thin film 26 forming a SAW waveguide has a curved center line, whereas the device shown in FIG. 9 has a straight center line. The device shown in FIG. 12 exhibits a better SAW intensity distribution than the device shown in FIG. 9.

Figure 13A:
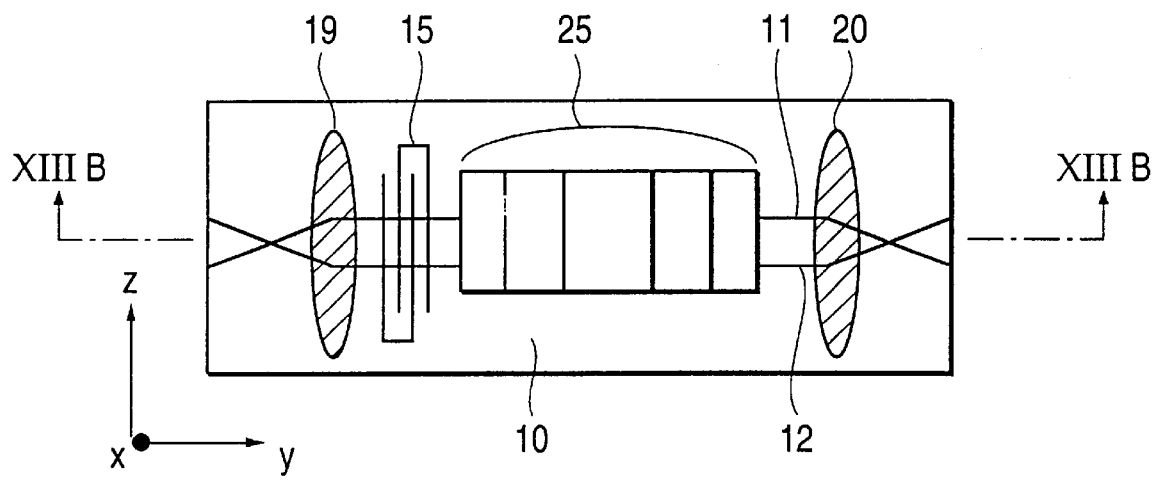
FIG. 13a is a top view of a third modification to the device shown in FIG. 9.
Figure 13B:
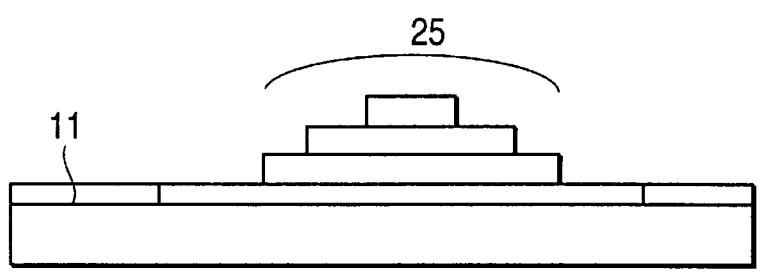

FIG. 13a shows a third modification of the device shown in FIG. 9. FIG. 13b is a cross-sectional view of the device shown in FIG. 13a taken through line XIIIB—XIIIB in FIG. 13A. In FIG. 13a, a SAW waveguide is realized by having a multilevel ridge 25. In the multilevel ridge 25, the lowest layer is longest and is a transparent thin film. A metal layer (different material than the lowest layer) is patterned on the lowest layer. The metal layer may be the top layer, having a length less than that of an intermediate transparent thin film, which in turn has a length less than that of the lowest layer. The lowest and intermediate layers may be formed at the same time.

Figure 14A:
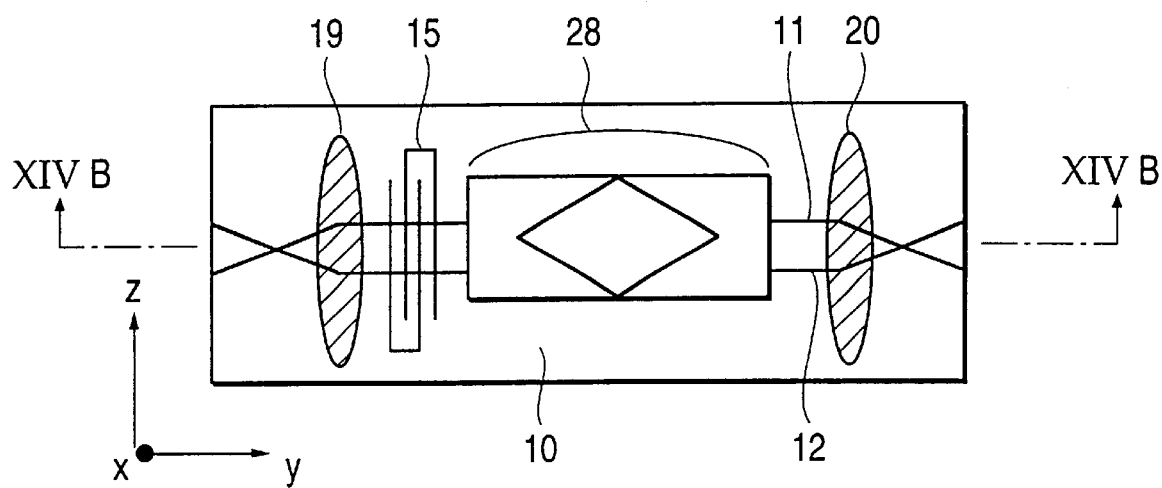
FIG. 14a is a top view of an alternative to the device shown in FIGS. 13a and 13b.
Figure 14B:
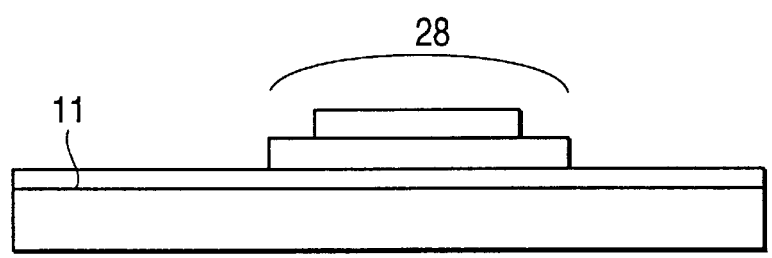

FIG. 14a is a top view of an alternative device to the device shown in FIGS. 13a and 13b. FIG. 14b is a cross-sectional view taken along line XIVB—XIVB in FIG. 14a. In FIGS. 14a and 14b, the thin film has a multilevel ridge 28, similar to the multilevel ridge 25 shown in FIGS. 13a and 13b. However, in FIGS. 14a and 14b, the upper part of the multilevel ridge 28 has a rhombus shape. That is, the metal film has a center portion with a width decreasing extending away from the center portion, in a length direction. The upper part may be formed of metal (material different than the lower part). The lower part may have a square shape. In the travelling direction, the upper part is not as long as the lower part. With the device shown in FIGS. 14a and 14b, an excellent SAW intensity distribution can be realized.

Fifth Preferred Embodiment

Figure 15:
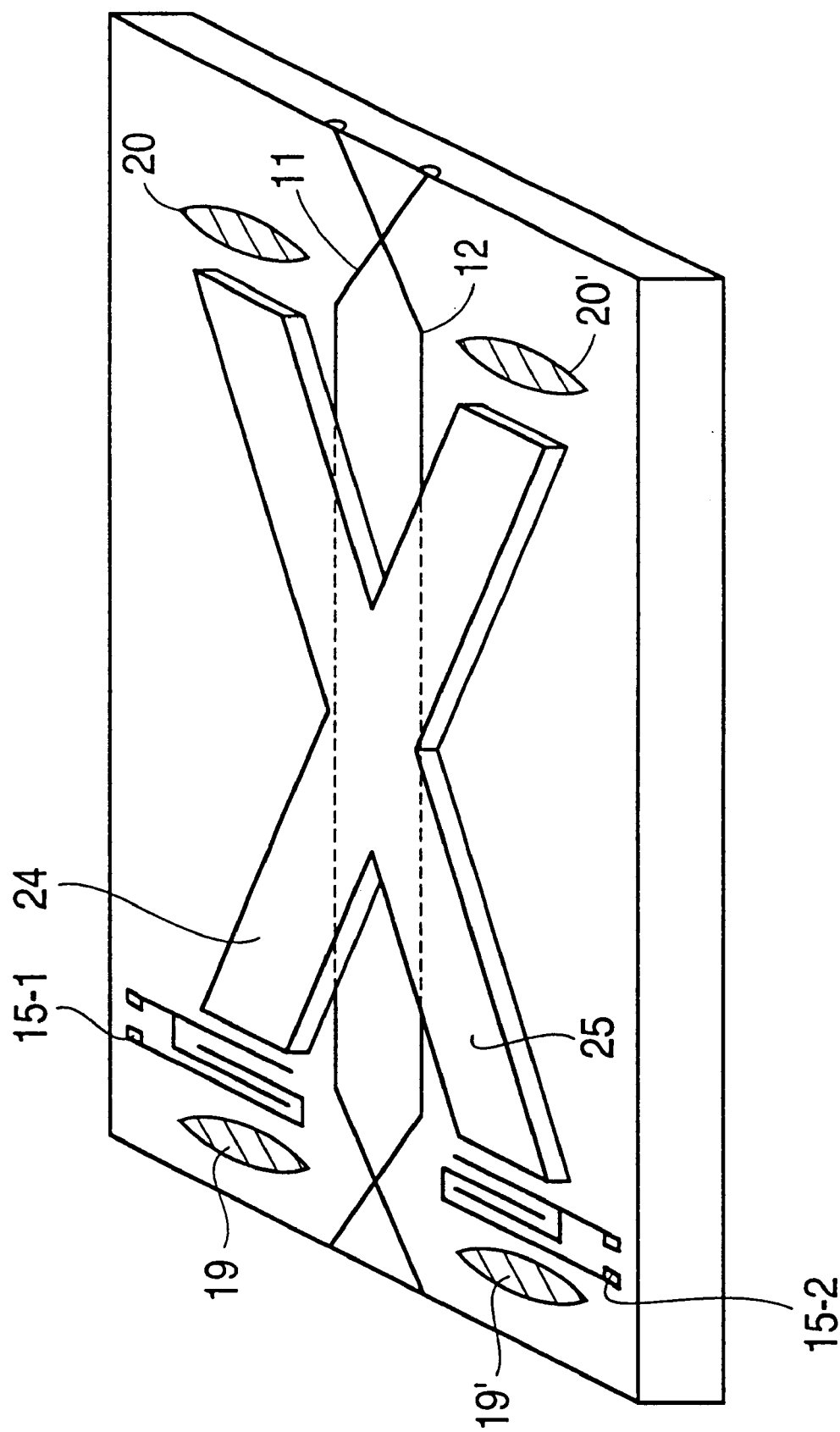
FIG. 15 is a perspective view of an optical device according to a fifth preferred embodiment of the present invention.

FIG. 15 is a perspective view of an optical device according to a fifth preferred embodiment of the present invention. In the device shown in FIG. 15, two thin films 24, 25 cross at a center of the $LiNbO_3$ substrate. Two transducer units 15-1, 15-2 are provided in the vicinity of the thin films 24, 25. The thin films 25, 25 respectively guide the SAWs produced by the transducer units 15-1, 15-2. The device shown in FIG. 15 can generate a SAW with a high efficiency, over a wide range of frequencies, and can realize small changes in wavelength.

In the device shown in FIG. 15, the center areas of the thin films 24, 25 overlap to form a single SAW waveguide, and the ends branch to form a plurality of SAW waveguides. The overlapping area of the thin films 24, 25 generates a large loss in SAW when the waveguides are combined, but a characteristic not depending on the incident direction can be realized at the center area. Moreover, in the case of FIG. 15, since the waveguide has the symmetrical structure, the light beams travelling in the vicinity of the branched ends are equally influenced by the SAW. Moreover, in this fifth preferred embodiment, the transducer is formed of two transducer units, and this can alleviate heat generation and mutual interference between SAWs. Such structure can easily be realized using the SAW waveguide of the present invention.

Sixth Preferred Embodiment

FIG. 16 is a top view of an optical device according to a sixth preferred embodiment of the present invention. FIG. 16 shows an embodiment where the SAW waveguide (thin film 18) is formed on only one optical waveguide 11. This structure can rotate the polarization of an optical signal guided by the optical waveguide 11 and perform TE/TM mode conversion. The thin film 18 guides and traps the SAW. The thin film 18 may be configured as shown in any one of FIGS. 7–9, and 11–15.

Seventh Preferred Embodiment

Figure 19:
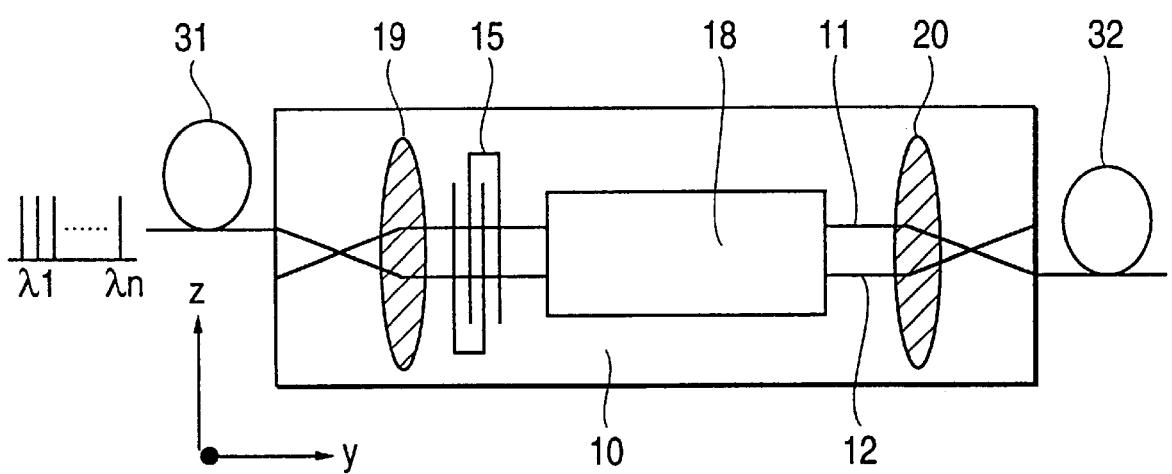
FIG. 19 is a top view of an optical device according to a seventh preferred embodiment of the present invention.

FIG. 19 is a top view of an optical device according to a seventh preferred embodiment of the present invention. In FIG. 19, a waveform multiplexed optical signal transmitted from an optical fiber 31 as the transmission line is input, a SAW corresponding to a selected wavelength λ of the optical signal is generated by the transducer 15, and the SAW generated by the transducer 15 is trapped in the substrate by the thin film 18. With the SAW, the polarization components for the selected wavelength λ are rotated in the optical waveguides. Thereby, the selected wavelength λ can be extracted from the optical fiber 32. The device shown in FIG. 19 can also be used provide a modulated signal of the selected wavelength λ at optical fiber 32. Modulation is done by intermittently outputting the SAW from the transducer 15.

According to the preferred embodiments of the present invention, a transducer excites a surface acoustic wave using the piezo effect. An optical waveguide propagates a light beam almost in the X or Y direction and is formed in the surface of an $LiNbO_3$ substrate. A waveguide is formed on the substrate for guiding the surface acoustic wave. The axial direction of the elliptic body having the refractive index is inclined by the surface acoustic wave. The device can rotate polarization and perform TE/TM mode conversion. An effective SAW waveguide can be realized by forming a thin film on the $LiNbO_3$ substrate. There is a wide degree of freedom in controlling filter characteristics. Filter characteristics can be controlled by varying film material, width, thickness and shape, using a multilevel ridge and/or using a pair of crossing thin films.

While the invention has been described in connection with the preferred embodiments, it will be understood that modifications within the principles outlined above will be evident to those skilled in the art. Thus, the invention is not limited to the preferred embodiments, but is intended to encompass such modifications.

What is claimed is:

1. An optical device, comprising:
   a substrate;
   an optical waveguide formed on the substrate to guide a light;
   a transducer formed on the substrate to excite a surface acoustic wave on the substrate and rotate a polarization state of the light; and
   a thin film covering a portion of the optical waveguide, the thin film being formed of silicon dioxide with an indium containing material added thereto, the thin film being transparent to the guided by the optical waveguide, the thin film having a refractive index smaller than that of the optical waveguide.

2. An optical device according to claim 1, further comprising a dielectric material film a metal film formed on the thin film.

3. An optical device according to claim 1, wherein the thin film is formed of silicon dioxide $SiO_2$ or silicon dioxide $SiO_2$ with a metal oxide added thereto.

4. An optical device according to claim 1, wherein the thin film has first and second portions respectively having different thicknesses.

5. An optical device according to claim 1, wherein the thin film is formed of a material such that the speed of sound in the thin film is less than that in the substrate.

6. An optical device according to claim 1, wherein:
   the think film is formed in a strip having a centerline, and
   the centerline of the thin film crosses the optical waveguide.

7. An optical device according to claim 6, wherein:
   the substrate has length and width directions with the optical waveguide extending in the length direction,
   the thin film is provided on the substrate to one side of the transducer, the thin film extends substantially the entire width direction of the substrate on the one side of the transducer, the dielectric material film or metal film is formed on the thin film over the optical waveguide, and the dielectric material film or metal film does not extend the entire width direction of the substrate.

8. An optical device according to claim 1, wherein:

the substrate has length and width directions, with the optical waveguide extending in the length direction, the thin film extends in the length and width directions, and the width of thin film changes across the length thereof.

9. An optical device according to claim 8, wherein:

the substrate has ends and length and width directions with the optical waveguide extending in the length direction, the thin film is provided on the substrate to one side of the transducer, the second portion of the thin film is thicker than the first portion of the thin film, the second portion of the thin film is formed over the optical waveguide, and the first portion of the thin film extends out in the width direction from the second portion, to the ends of the substrate.

10. An optical device according to claim 1, further comprising a metal film formed on the thin film, wherein:

the substrate has length and width directions with the optical waveguide extending in the length direction, the thin film has first and second portions, the second portion being formed on the first portion and having a length less than that of the first portion, and the metal film is formed on the second portion of the thin film and has a length less than that of the second portion.

11. An optical device according to claim 1, further comprising a metal film formed on the thin film, wherein:

the substrate has length and width directions with the optical waveguide extending in the length direction, and the metal film has a length less than that of the thin film.

12. An optical device according to claim 1, wherein:

the substrate has length and width directions, with the optical waveguide extending in the length direction, the thin film extends in the length and width directions, and the width of thin film changes across the length thereof.

13. An optical device according to claim 1, wherein:

the transducer is formed from first and second transducer units, the thin film is formed from first and second film portions, both covering a portion of the optical waveguide, the first and second film portions cross on the substrate, and the first and second transducer units are respectively provided adjacent to the first and second film portions.

14. An optical device according to claim 1, wherein:

the substrate is an X-cut $LiNbO_3$ substrate, and the optical waveguide is formed extending in the y axis direction of the X-cut $LiNbO_3$ substrate.

15. An optical device according to claim 1, wherein the thin film has a width within the range of from 30 to 250 $\mu$m.

16. An optical device according to claim 1, wherein the waveguide is formed of titanium diffused into the substrate.

17. An optical device according to claim 1, wherein the transducer is formed of a comb-tooth electrode.

18. An optical device according to claim 1, wherein the optical waveguide extends between two ends of the substrate, the device further comprising a pair of SAW absorbing bodies respectively provided toward the two ends of the substrate.

19. An optical device according to claim 1, wherein the thin film is formed of silicon dioxide with indium oxide added thereto.

20. An optical device, comprising:

a substrate;

an optical waveguide formed on the substrate to guide a light;

a transducer formed on the substrate to excite a surface acoustic wave on the substrate and rotate a polarization state of the light; and a thin film covering a portion of the optical waveguide, the thin film being formed of silicon dioxide with an indium containing material added thereto, the speed of sound under the thin film being less than in a portion of the substrate not covered by the film.

21. An optical device according to claim 20, wherein the thin film is formed of silicon dioxide $SiO_2$ or silicon dioxide $SiO_2$ with a metal oxide added thereto.

22. An optical device according to claim 20, wherein the thin film is formed of indium oxide or indium oxide with a metal oxide added thereto.

23. An optical device according to claim 20, further comprising a dielectric material film or metal film formed on the thin film.

24. An optical device according to claim 23, wherein:

the substrate has length and width directions with the optical waveguide extending in the length direction, the thin film is provided on the substrate to one side of the transducer, the thin film extends substantially the entire width direction of the substrate on the one side of the transducer, the dielectric material film or metal film is formed on the thin film over the optical waveguide, and the dielectric material film or metal film does not extend the entire width direction of the substrate.

25. An optical device according to claim 20, wherein the thin film has first and second portions respectively having different thicknesses.

26. An optical device according to claim 25, wherein:

the substrate has ends and length and width directions with the optical waveguide extending in the length direction, the thin film is provided on the substrate to one side of the transducer, the second portion of the thin film is thicker than the first portion of the thin film, the second portion of the thin film is formed over the optical waveguide, and the first portion of the thin film extends out in the width direction from the second portion, to the ends of the substrate.

27. An optical device according to claim 20, wherein:

the thin film is formed in a strip having a centerline, and the centerline of the thin film crosses the optical waveguide.

28. An optical device according to claim 20, wherein the film has curved end portions such that the centerline is curved.

29. An optical device according to claim 20, wherein:
the substrate has length and width directions, with the optical waveguide extending in the length direction,
the thin film extends in the length and width directions, and
the width of thin film changes across the length thereof.

30. An optical device according to claim 29, wherein the width of the thin film is greater in a middle portion than at end portions of the thin film.

31. An optical device according to claim 20, further comprising a metal film formed on the thin film, wherein:
the substrate has length and width directions with the optical waveguide extending in the length direction,
the thin film has first and second portions, the second portion being formed on the first portion and having a length less than that of the first portion, and
the metal film is formed on the second portion of the thin film and has a length less than that of the second portion.

32. An optical device according to claim 20, further comprising a metal film formed on the thin film, wherein:
the substrate has length and width directions with the optical waveguide extending in the length direction, and
the metal film has a length less than that of the thin film.

33. An optical device according to claim 32, wherein the metal film has a center portion and a rhombus shape such that the width of the metal film decreases extending away from the center portion, in the length direction.

34. An optical device according to claim 20, wherein:
the transducer is formed from first and second transducer units,
the thin film is formed from first and second film portions, both covering a portion of the optical waveguide,
the first and second film portions cross on the substrate, and
the first and second transducer units are respectively provided adjacent to the first and second film portions.

35. An optical device according to claim 20, wherein:
the substrate is an X-cut $LiNbO_3$ substrate, and
the optical waveguide is formed extending in the y axis direction of the X-cut $LiNbO_3$ substrate.

36. An optical device according to claim 20, wherein the thin film has a width within the range of from 30 to 250 $\mu$m.

37. An optical device according to claim 20 wherein the waveguide is formed of titanium diffused into the substrate.

38. An optical device according to claim 20, wherein the transducer is formed of a comb-tooth electrode.

39. An optical device according to claim 20, wherein the optical waveguide extends between two ends of the substrate, the device further comprising a pair of SAW absorbing bodies respectively provided toward the ends of the substrate.

40. An optical device according to claim 20, wherein the thin film is formed of silicon dioxide with indium oxide added thereto.

41. An optical device comprising:
a substrate;
a polarization beam splitter formed on the substrate and having input and output sides;
a first pair of optical waveguides formed on the substrate to meet at the input side of the polarization beam splitter;
a second pair of optical waveguides formed on the substrate to meet at the output side of the polarization beam splitter;
a transducer formed on the substrate to excite a surface acoustic wave; and
a thin film covering a portion of each waveguide of either the first or second pairs of optical waveguides, the thin film being formed of silicon dioxide with an indium containing material added thereto.

42. An optical device according to claim 23, wherein the waveguides are formed of titanium diffused into the substrate.

43. An optical device according to claim 41, wherein the speed of sound in the thin film is less than that in the substrate.

44. An optical device according to claim 23, wherein the optical waveguides extend between two ends of the substrate, the device further comprising a pair of SAW absorbing bodies respectively provided toward the two ends of the substrate.

45. An optical device according to claim 44, wherein:
the substrate has length and width directions with the optical waveguides extending in the length direction,
the thin film is provided on the substrate to one side of the transducer,
the thin film extends substantially the entire width direction of the substrate on the one side of the transducer,
the dielectric material film or metal film is formed on the thin film over the portion of each waveguide, and
the dielectric material film or metal film does not extend the entire width direction of the substrate.

46. An optical device according to claim 41, wherein the thin film has first and second portions respectively having different thicknesses.

47. An optical device according to claim 46, wherein:
the substrate has ends and length and width directions with the optical waveguides extending in the length direction,
the thin film is provided on the substrate to one side of the transducer,
the second portion of the thin film is thicker than the first portion of the thin film,
the second portion of the thin film is formed over the portion of each waveguide, and
the first portion of the thin film extends out in the width direction from the second portion, to the ends of the substrate.

48. An optical device according to claim 41, wherein:
the thin film is formed in a strip having a centerline, and
the centerline of the thin film crosses the portion of each waveguide.

49. An optical device according to claim 48, wherein the film has curved end portions such that the centerline is curved.

50. An optical device according to claim 41, wherein:
the substrate has length and width directions, with the optical waveguides extending in the length direction,
the thin film extends in the length and width directions, and
the width of thin film changes across the length thereof.

51. An optical device according to claim 50, wherein the width of the thin film is greater in a middle portion that at end portions of the thin film.

52. An optical device according to claim 41, further comprising a metal film formed on the thin film, wherein:
the substrate has length and width directions with the optical waveguides extending in the length direction, the thin film has first and second portions, the second portion being formed on the first portion and having a length less than that of the first portion, and the metal film is formed on the second portion of the thin film and has a length less than that of the second portion.

53. An optical device according to claim 41, further comprising a metal film formed on the thin film, wherein:

the substrate has length and width directions with the optical waveguides extending in the length direction, and the metal film has a length less than that of the thin film.

54. An optical device according to claim 53, wherein the metal film has a center portion and a rhombus shape such that the width of the metal film decreases extending away from the center portion, in the length direction.

55. An optical device according to claim 41, wherein:

the transducer is formed from first and second transducer units, the thin film is formed from first and second film portions, both covering the portion of each waveguide, the first and second film portions cross on the substrate, and the first and second transducer units are respectively provided adjacent to the first and second film portions.

56. An optical device according to claim 41, wherein:

the substrate is an X-cut LiNbO$_3$ substrate, and the optical waveguides are formed extending in the y axis direction of the X-cut and LiNbO$_3$ substrate.

57. An optical device according to claim 41, wherein the thin film has a width within the range of from 30 to 250 $\mu$m.

58. An optical device according to claim 41, wherein the waveguides are formed of titanium diffused into the substrate.

59. An optical device according to claim 41, wherein the transducer is formed of a comb-tooth electrode.

60. An optical device according to claim 41, wherein the optical waveguides extend between two ends of the substrate, the device further comprising a pair of SAW absorbing bodies respectively provided toward the two ends of the substrate.

61. An optical device according to claim 41, wherein the thin film is formed of silicon dioxide with indium oxide added thereto.

62. An optical device comprising:

a substrate;

an optical waveguide formed on the substrate to guide a light;

a transducer formed on the substrate to excite a surface acoustic wave on the substrate and rotate a polarization state of the light; and a thin film dispersed on the substrate to guide the surface acoustic wave in the substrate so as to reduce the speed of sound around the optical wave guide, the thin film being formed of silicon dioxide with an indium containing material added thereto.

63. An optical device according to claim 62, wherein the film is formed of silicon dioxide with indium oxide added thereto.

64. An optical device comprising:

a substrate;

a polarization beam splitter formed on the substrate and having input and output sides;

a first pair of optical waveguides formed on the substrate to meet at the input side of the polarization beam splitter;

a second pair of optical waveguides formed on the substrate to meet at the output side of the polarization beam splitter;

a transducer formed on the substrate to excite a surface acoustic wave; and a thin film covering a portion of each waveguide of either the first or second pairs of optical waveguides, the thin film being formed of silicon dioxide with an indium containing material added thereto, the thin film being transparent to the light guided by the optical wave guide, and the thin film having a refractive index smaller than that of the optical waveguide.

65. An optical device according to claim 64, wherein the thin film is formed of silicon oxide with indium oxide added thereto.

66. An optical device comprising:

a substrate;

a polarization beam splitter formed on the substrate and having input and output sides;

a first pair of optical waveguides formed on the substrate to meet at the input side of the polarization beam splitter;

a second pair of optical waveguides formed on the substrate to meet at the output side of the polarization beam splitter;

a transducer formed on the substrate to excite a surface acoustic wave; and a thin film covering a portion of each waveguide of either the first or second pairs of optical waveguides, the thin film being formed of silicon dioxide with an indium containing material added thereto, the speed of sound under the thin film being less than in a portion of the substrate not covered by the thin film.

67. An optical device according to claim 66, wherein the thin film is formed of silicon dioxide with indium oxide added thereto.

* * * * *

UNITED STATES PATENT AND TRADEMARK OFFICE
CERTIFICATE OF CORRECTION

PATENT NO. : 6,400,881 B1
DATED : June 4, 2002
INVENTOR(S) : Minoru Seino et al.

It is certified that error appears in the above-identified patent and that said Letters Patent is hereby corrected as shown below:

Title page,
Item [56], References Cited, FOREIGN PATENT DOCUMENTS, change "90-049994" to -- 9-049994 --.

Column 10,
Line 60, change "think" to -- thin --.

Signed and Sealed this

Nineteenth Day of November, 2002

*Attest:*

JAMES E. ROGAN
*Attesting Officer*   *Director of the United States Patent and Trademark Office*